US009325392B2

(12) United States Patent  (10) Patent No.: US 9,325,392 B2
Chin  (45) Date of Patent: Apr. 26, 2016

(54) HORIZONTALLY POLARIZED OMNIDIRECTIONAL ANTENNA AND ANTENNA DEVICE INCORPORATING THE SAME (71) Applicant: NATIONAL CHIAO TUNG UNIVERSITY, Hsinchu (TW)

(72) Inventor: Cheng-Yuan Chin, Taichung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 14/555,925

(22) Filed: Nov. 28, 2014

(65) Prior Publication Data

US 2016/0043780 A1 Feb. 11, 2016

(30) Foreign Application Priority Data

Aug. 5, 2014 (TW) ............................. 103126757 A (51) Int. Cl.
H01Q 1/24 (2006.01)
H04M 1/00 (2006.01)
H01Q 13/10 (2006.01)
H04B 7/02 (2006.01)
H04W 88/06 (2009.01)

(52) U.S. Cl.
CPC ............... *H04B 7/028* (2013.01); *H04W 88/06* (2013.01)

(58) Field of Classification Search
USPC ................ 343/767, 770, 793, 797; 455/567.1
See application file for complete search history.

(56) References Cited

U.S. PATENT DOCUMENTS

| 5,966,102 | A | * | 10/1999 | Runyon | ................ | H01Q 1/246 343/797 |
| 8,427,385 | B2 | | 4/2013 | Payne | | |
| 8,779,998 | B1 | * | 7/2014 | Pickles | ................ | H01Q 13/10 343/767 |
| 2004/0066345 | A1 | * | 4/2004 | Schadler | ................ | H01Q 1/246 343/767 |
| 2015/0236424 | A1 | * | 8/2015 | Panther | ................ | H01Q 9/0435 343/700 MS |

FOREIGN PATENT DOCUMENTS

TW 310486 7/1997
TW M461889 9/2013

OTHER PUBLICATIONS

Haruo Kawakami et al., "Characteristics of TV Transmitting Batwing Antennas." *IEEE Transactions on Antennas and Propagation*. vol. AP-32, No. 12, 1318-1326, Dec. 1984.
Fenn, Alan J., "Arrays of Horizontally Polarized Loop-Fed Slotted Cylinder Antennas." *IEEE Transactions on Antennas and Propagation*. vol. AP-33, No. 4, 375-382, Apr. 1985.
Atsuya Ando et al., "Dielectric-Loaded Slotted-Cylinder Antennas offering reduced Base Station Interference for Personal Communication Services." *Antennas and Propagation Society International Symposium*. vol. 3, 1454-1457, 1998.
Ivana Radnovic1 et al., "A New Type of Turnstile Antenna." *IEEE Antennas and Propagation Magazine*. vol. 52, No. 5, 168-171, Oct. 2010.
Cheng-Yuan Chin et al., "A Slim Horizontally Polarized Omnidirectional Antenna Based on Turnstile Slot Dipole." *Progress in Electromagnetics Research C*. vol. 50, 75-85. 2014.

* cited by examiner

*Primary Examiner* — Blane J Jackson
(74) *Attorney, Agent, or Firm* — Nixon & Vanderhye P.C.

(57) ABSTRACT

An antenna includes a pair of first and second slot antenna bodies that integrally intersect each other and that are perpendicular to each other. The first and second slot antenna bodies are adapted to respectively receive a first radio frequency (RF) signal and a second RF signal that have the same magnitude and a 90-degree phase difference. Upon receipt of the first and second RF signals, the antenna is capable of producing a horizontally polarized omnidirectional radiation pattern.

14 Claims, 12 Drawing Sheets

HORIZONTALLY POLARIZED OMNIDIRECTIONAL ANTENNA AND ANTENNA DEVICE INCORPORATING THE SAME

CROSS-REFERENCE TO RELATED APPLICATION

This application claims priority to Taiwanese Application No. 103126757, filed on Aug. 5, 2014, the contents of which are hereby incorporated by reference.

FIELD OF THE INVENTION

The invention relates to an antenna, and more particularly to a horizontally polarized omnidirectional antenna and an antenna device incorporating the same.

BACKGROUND OF THE INVENTION

In certain situations, an antenna with an omnidirectional radiation pattern is desirable. For instance, such a characteristic is typically preferred for an antenna in a transmitter application.

Recent developments in the antenna art have produced several types of antennas capable of providing a horizontally polarized omnidirectional radiation pattern. For example, one type is an Alford loop strip antenna and a turnstile antenna, which are constructed from two dipole antennas. However, such antennas usually have larger sizes in transverse cross-section. Therefore, there is still room for improvement in the above techniques.

SUMMARY OF THE INVENTION

Therefore, an object of the present invention is to provide an antenna and an antenna device incorporating the same that are capable of producing a horizontally polarized omnidirectional radiation pattern and that can overcome the aforesaid drawback of the prior art.

According to one aspect of the present invention, there is provided an antenna capable of producing a horizontally polarized omnidirectional radiation pattern when receiving a first radio frequency (RF) signal and a second RF signal that have the same magnitude and a 90-degree phase difference. The antenna of this invention comprises a pair of first and second slot antenna bodies that integrally intersect each other and that are perpendicular to each other. The first and second slot antenna bodies are adapted to respectively receive the first and second RF signals.

According to another aspect of the present invention, an antenna device comprises:

an antenna including a pair of first and second slot antenna bodies that integrally intersect each other and that are perpendicular to each other; and a signal processor having an input port that is configured to receive an input radio frequency (RF) signal, and a first output port and a second output port that are coupled respectively to the first and second slot antenna bodies, the signal processor being operable to divide the input RF signal into a first RF signal and a second RF signal that have the same magnitude and a 90-degree phase difference and that are outputted respectively at the first and second output ports.

Upon receipt of the first and second RF signals from the signal processor, the antenna is capable of producing a horizontally polarized omnidirectional radiation pattern.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Before the present invention is described in greater detail, it should be noted herein that like elements are denoted by the same reference numerals throughout the disclosure.

Figure 1:
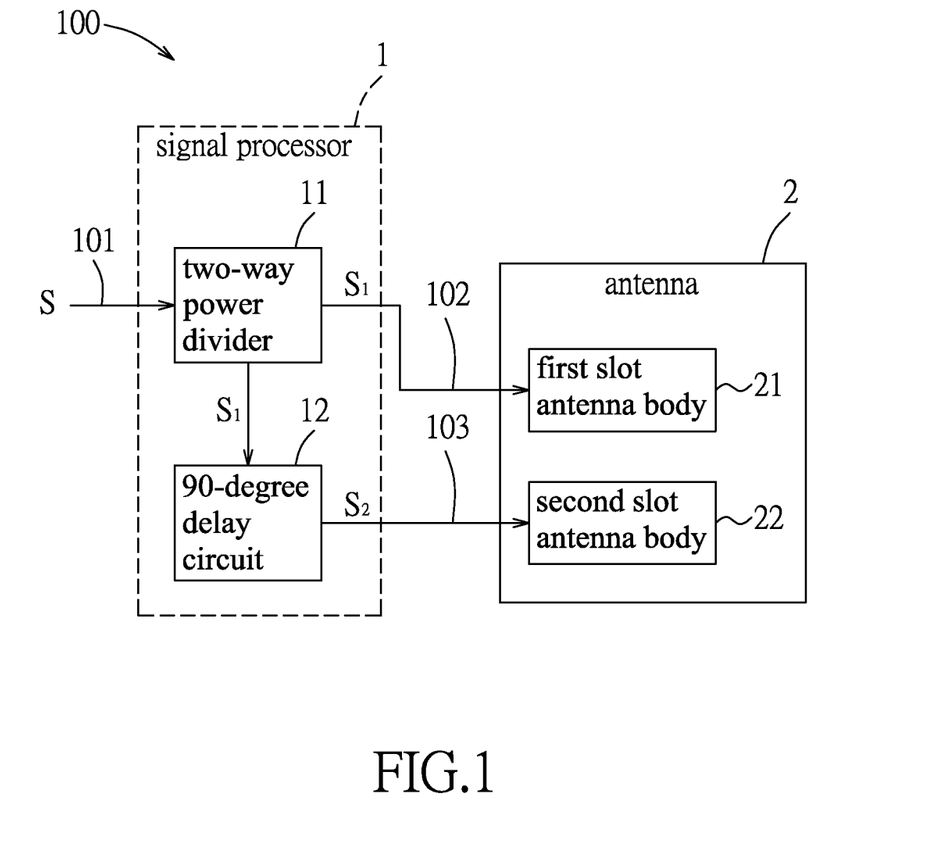
FIG. 1 is a schematic block diagram illustrating the first embodiment of an antenna device according to the present invention.

Referring to FIG. 1, the first embodiment of an antenna device 100 according to the present invention is shown to include a signal processor 1 and an antenna 2.

The signal processor 1 has an input port 101, a first output port 102 and a second output port 103. The input port 101 is adapted to receive an input radio frequency (RF) signal (S). The signal processor 1 is operable to divide the input RF signal (S) into a first RF signal ($S_1$) and a second RF signal ($S_2$). The first and second RF signals ($S_1$, $S_2$) have the same magnitude and a 90-degree phase difference, and are outputted respectively at the first and second output ports 102, 103. In this embodiment, the signal processor 1 includes, but is not limited to, a two-way power divider 11 and a 90-degree delay circuit 12. The two-way power divider 11 has an input terminal that serves as the input port 101 adapted for receiving the input RF signal (S), a first output terminal that serves as the first output port 102, and a second output terminal. The two-way power divider 11 is operable to divide the input RF signal (S) into two identical RF signals ($S_1$) that have half the power of the input RF signal (S) and that are outputted respectively at the first and second output terminals thereof.

Figure 13:
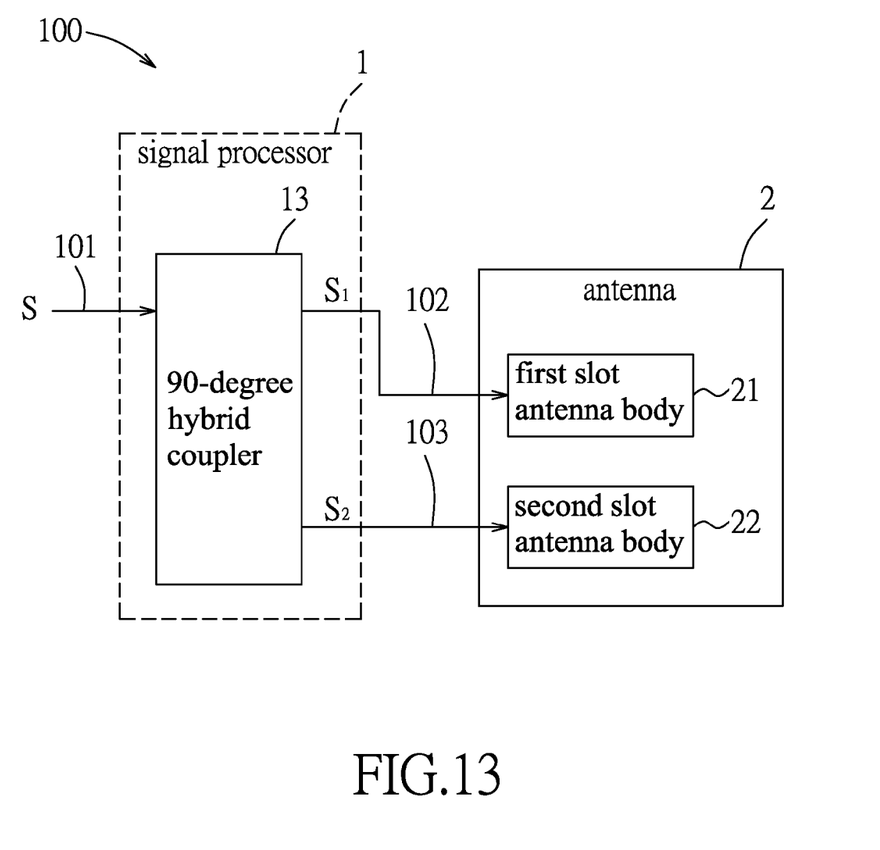
FIG. 13 is a schematic block diagram illustrating a variation of the first embodiment according to the present invention.

The RF signal ($S_1$) outputted at the first output terminal serves as the first RF signal ($S_1$). The 90-degree delay circuit 12 is coupled to the second output terminal of the two-way power divider 11 for receiving the RF signal ($S_1$) therefrom and is further coupled to the second output port 103. The 90-degree delay circuit 12 is operable to generate, based on the RF signal ($S_1$), an output signal ($S_2$) that is phase shifted by 90 degrees relative to the RF signal ($S_1$) and that is outputted to the second output port 103 to serve as the second RF signal ($S_2$). In other embodiments, the signal processor 1 can be a 90-degree hybrid coupler 13 (FIG. 13).

Figure 2:
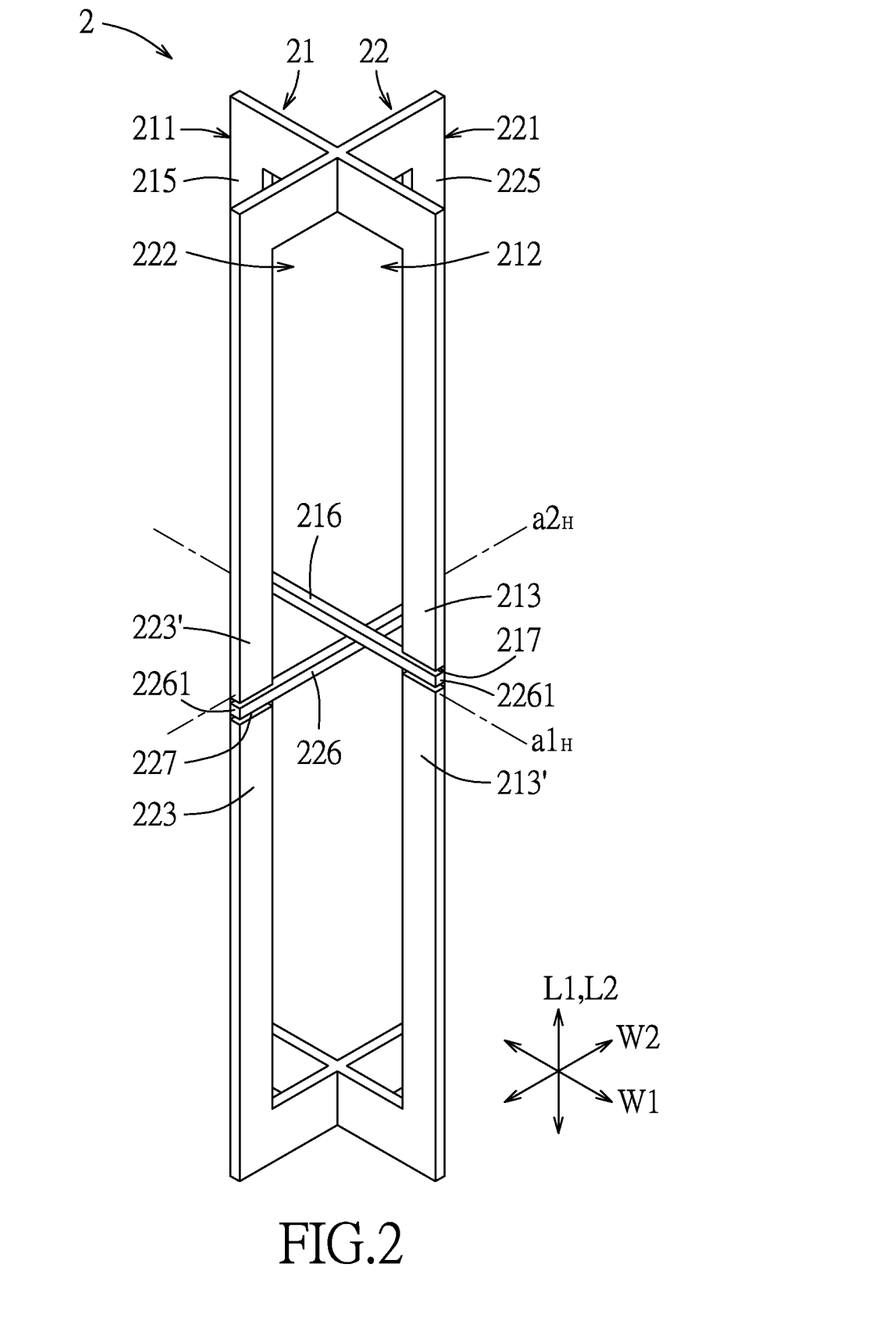
FIG. 2 is a perspective view showing an antenna of the first embodiment.

Referring to FIGS. 1 and 2, the antenna 2 includes a pair of first and second slot antenna bodies 21, 22 that integrally intersect each other and that are perpendicular to each other. The first and second slot antenna bodies 21, 22 respectively receive the first and second RF signals ($S_1$, $S_2$) (FIG. 1). The first and second slot antenna bodies 21, 22 are similar to each other.

Figure 3:
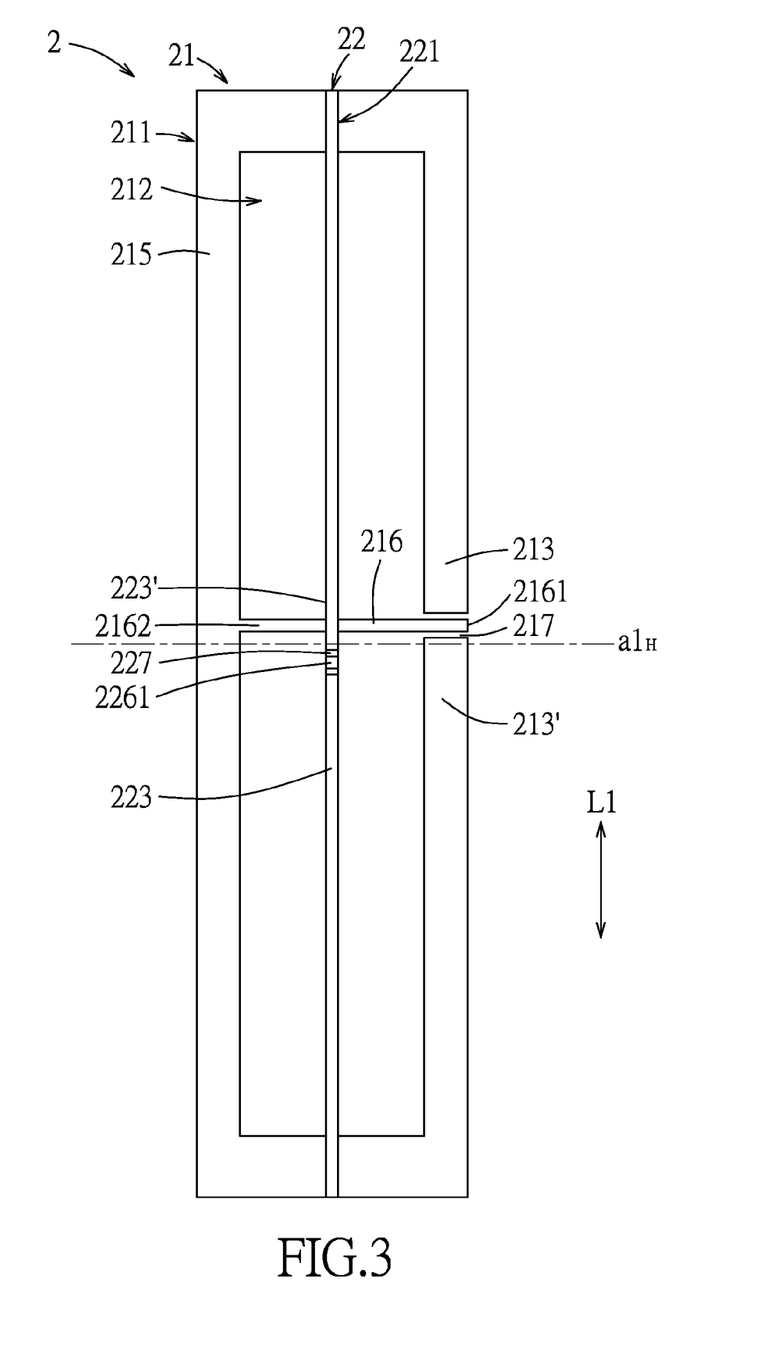
FIG. 3 is a schematic side view showing the antenna of the first embodiment for distinctly viewing a first slot antenna body.

Referring to FIGS. 2 and 3, the first slot antenna body 21 includes a rectangular flat conducting plate 211 and an elongate coplanar waveguide transmission conductor 216. The conducting plate 211 is formed with a rectangular main slot 212, and a notch 217 that is in spatial communication with the main slot 212 and that is misaligned with a transverse central axis ($a1_H$) of the conducting plate 211. The main slot 212 extends in a lengthwise direction (L1) of the conducting plate 211, i.e., a longitudinal direction, which is perpendicular to the transverse central axis ($a1_H$) across a center of the conducting plate 211. The conducting plate 211 has spaced apart first and second grounding plate portions 213, 213' that are vertically opposite to each other so as to define the notch 217 therebetween, and a radiating plate portion 215 that integrally interconnects and cooperates with the first and second grounding plate portions 213, 213' to define the main slot 212. The coplanar waveguide transmission conductor 216 is coplanar with the conducting plate 211, and extends horizontally from the conducting plate 211 through the main slot 212 and into the notch 217. The coplanar waveguide transmission conductor 216 has a connecting end 2162 that is connected integrally to the radiating plate portion 215 (see FIG. 3), and a feeding end 2161 that is horizontally opposite to the connecting end 2162, that is disposed in the notch 217 and spaced apart from the first and second grounding plate portions 213, 213', and that is coupled to the first output port 102 of the signal processor 1 using, for example, a subminiature version A (SMA) connector for receiving the first RF signal ($S_1$).

Figure 4:
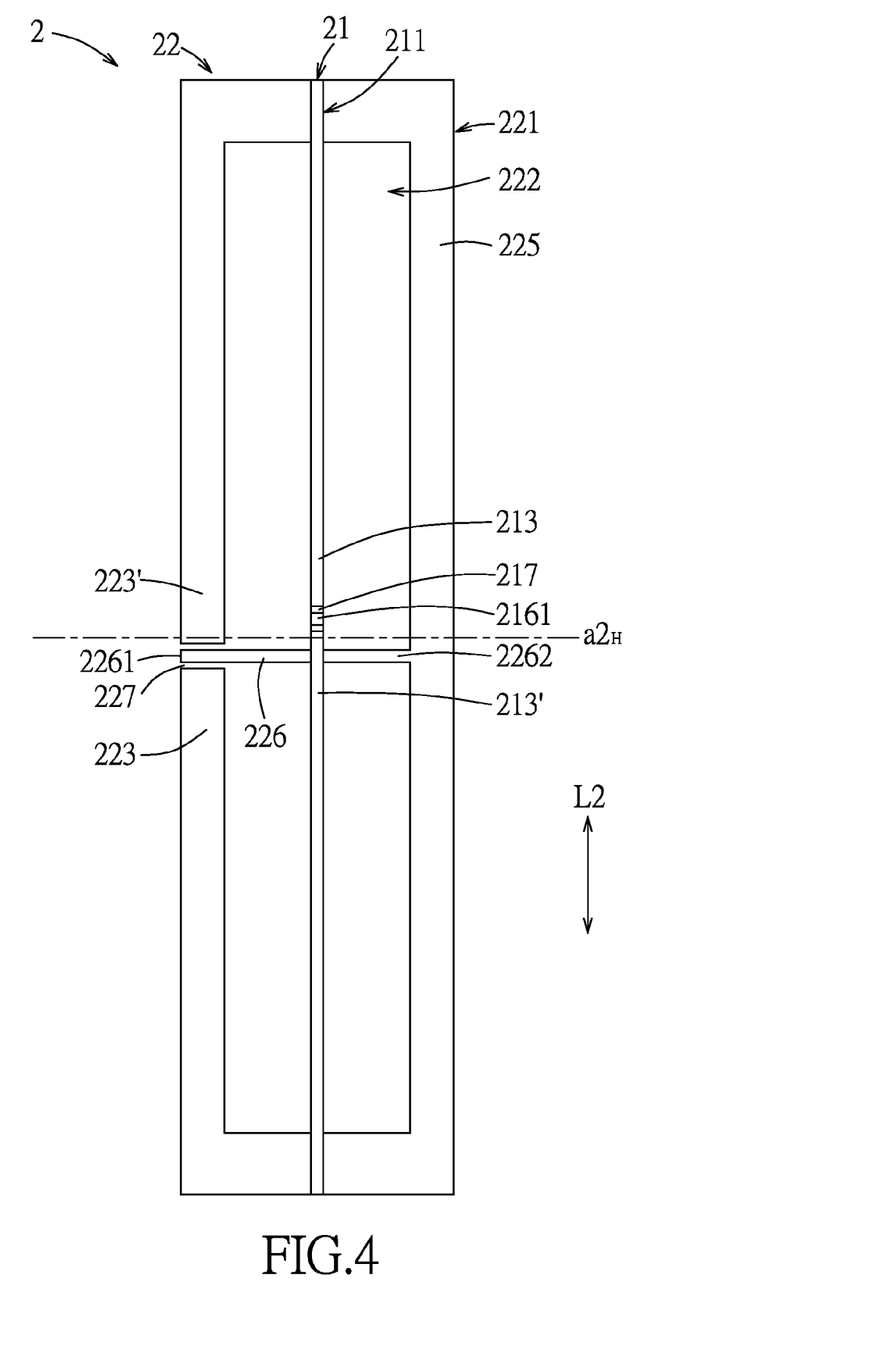
FIG. 4 is another schematic side view showing the antenna of the first embodiment for distinctly viewing a second slot antenna body.

Referring to FIGS. 2 and 4, similarly, the second slot antenna body 22 includes a rectangular flat conducting plate 221 and an elongate coplanar waveguide transmission conductor 226. The conducting plate 221 is formed with a rectangular main slot 222, and a notch 227 that is in spatial communication with the main slot 222 and that is misaligned with a transverse central axis ($a2_H$) of the conducting plate 221. The main slot 222 extends in a lengthwise direction (L2) of the conducting plate 221, i.e., the longitudinal direction, which is perpendicular to the transverse central axis ($a2_H$) across a center of the conducting plate 221. The conducting plate 221 has spaced apart first and second grounding plate portions 223, 223' that are vertically opposite to each other so as to define the notch 227 therebetween, and a radiating plate portion 225 that integrally interconnects and cooperates with the first and second grounding plate portions 223, 223' to define the main slot 222. The coplanar waveguide transmission conductor 226 is coplanar with the conducting plate 221, and extends horizontally from the conducting plate 221 through the main slot 222 and into the notch 227. The coplanar waveguide transmission conductor 226 has a connecting end 2262 that is connected integrally to the radiating plate portion 225 (see FIG. 4), and a feeding end 2261 that is horizontally opposite to the connecting end 2262, that is disposed in the notch 227 and spaced apart from the first and second grounding plate portions 223, 223', and that is coupled to the second output port 103 of the signal processor 1 using, for example, an SMA connector for receiving the second RF signal ($S_2$).

Referring again to FIG. 2, the conducting plates 211, 221 of the first and second slot antenna bodies 21, 22 integrally intersect and are perpendicular to each other, and are vertically inverted with respect to each other. The main slots 212, 222 in the conducting plates 211, 221 of the first and second slot antenna bodies 21, 22 are in spatial communication with each other. The coplanar waveguide transmission conductors 216, 226 of the first and second slot antenna bodies 21, 22 are spaced apart from and perpendicular to each other. In the orientation depicted in FIG. 2, the coplanar waveguide transmission conductor 216 is disposed above the coplanar waveguide transmission conductor 226.

In such a configuration, upon receipt of the first and second RF signals ($S_1$, $S_2$), the antenna 2 is capable of producing a horizontally polarized omnidirectional radiation pattern.

Figure 5:
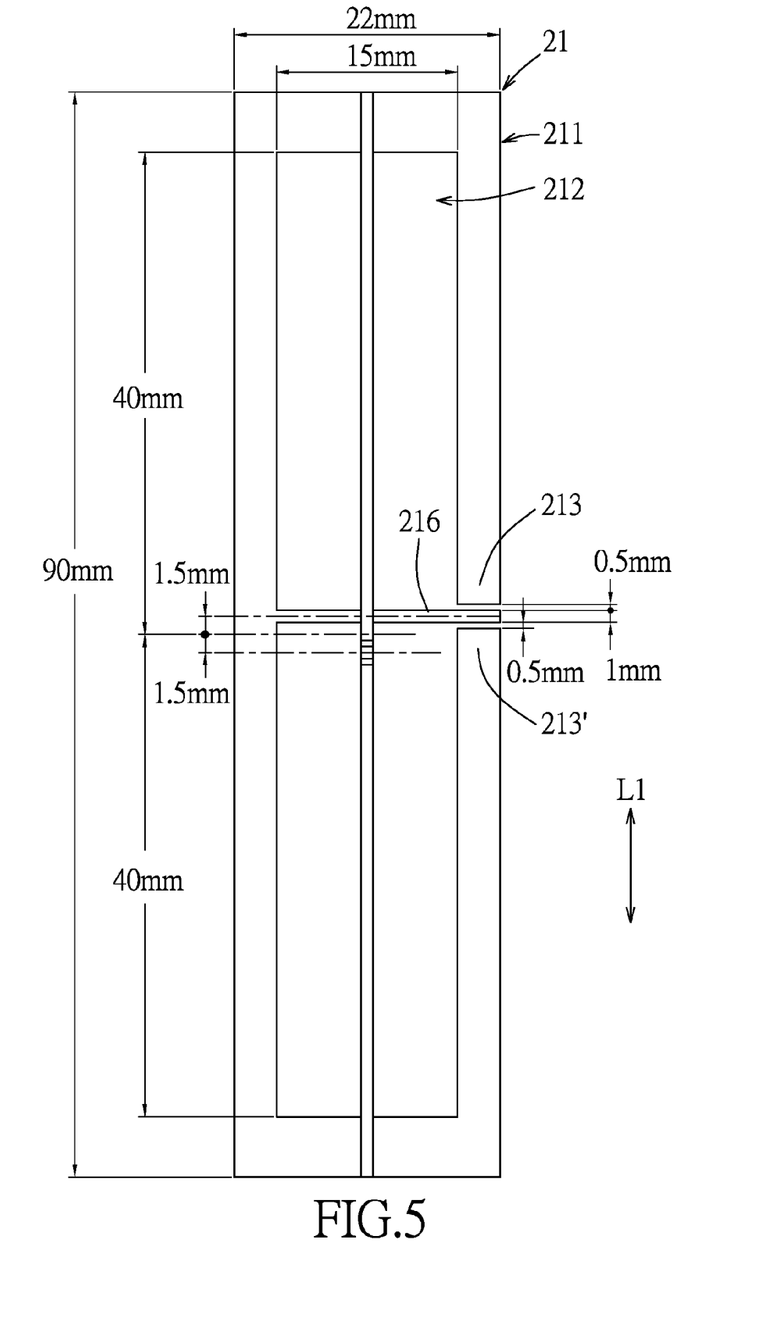
FIG. 5 is a schematic view illustrating exemplary dimensional specifications of the first slot antenna body of the antenna of the first embodiment.
Figure 6:
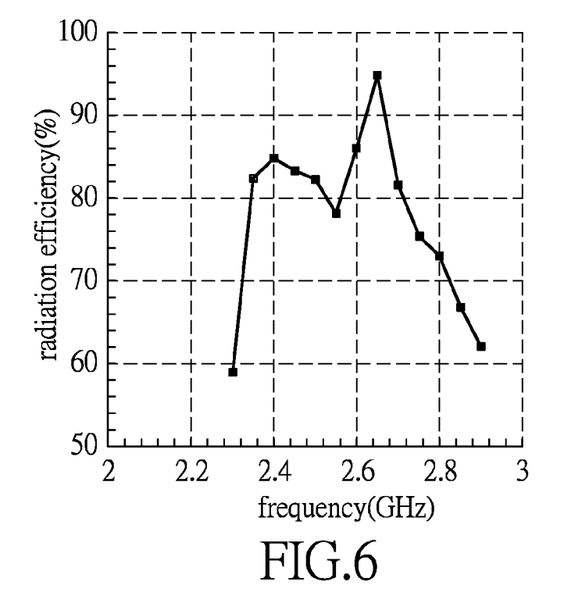
FIG. 6 is an exemplary radiation efficiency chart of the first embodiment.
Figure 7:
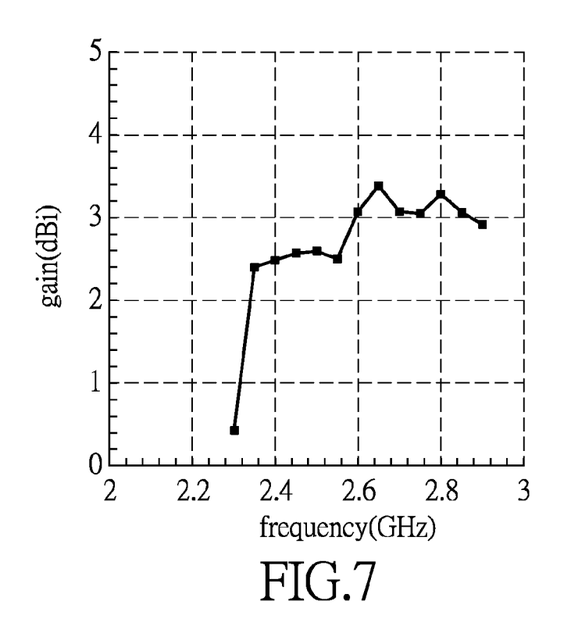
FIG. 7 is an exemplary gain chart of the first embodiment.
Figure 8:
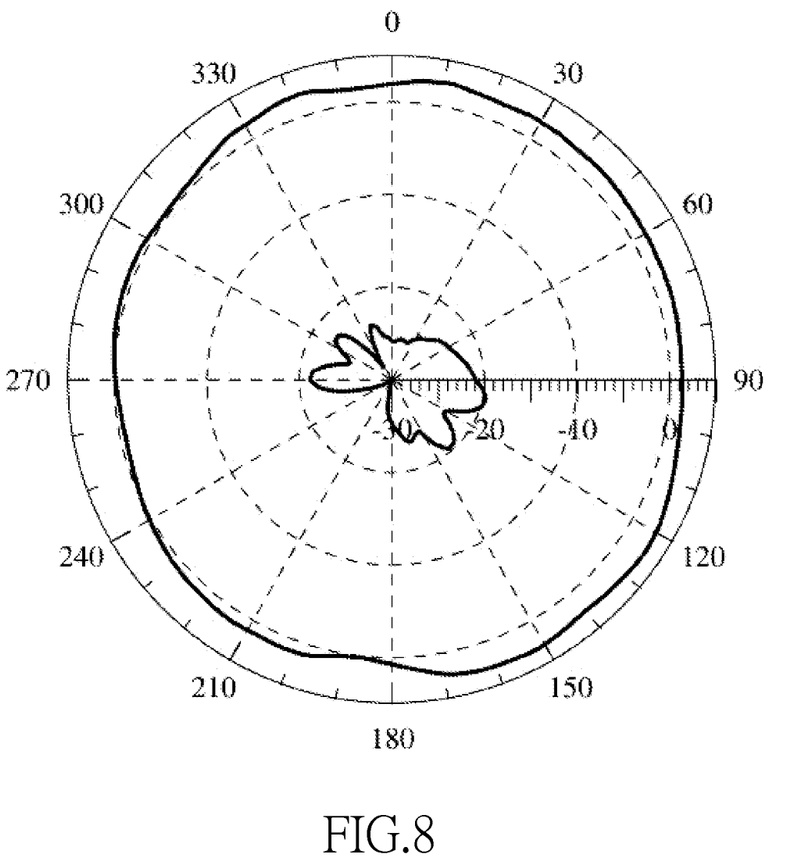
FIG. 8 is a graph showing an exemplary E-plane radiation pattern of the first embodiment at 2.6 GHz.
Figure 9:
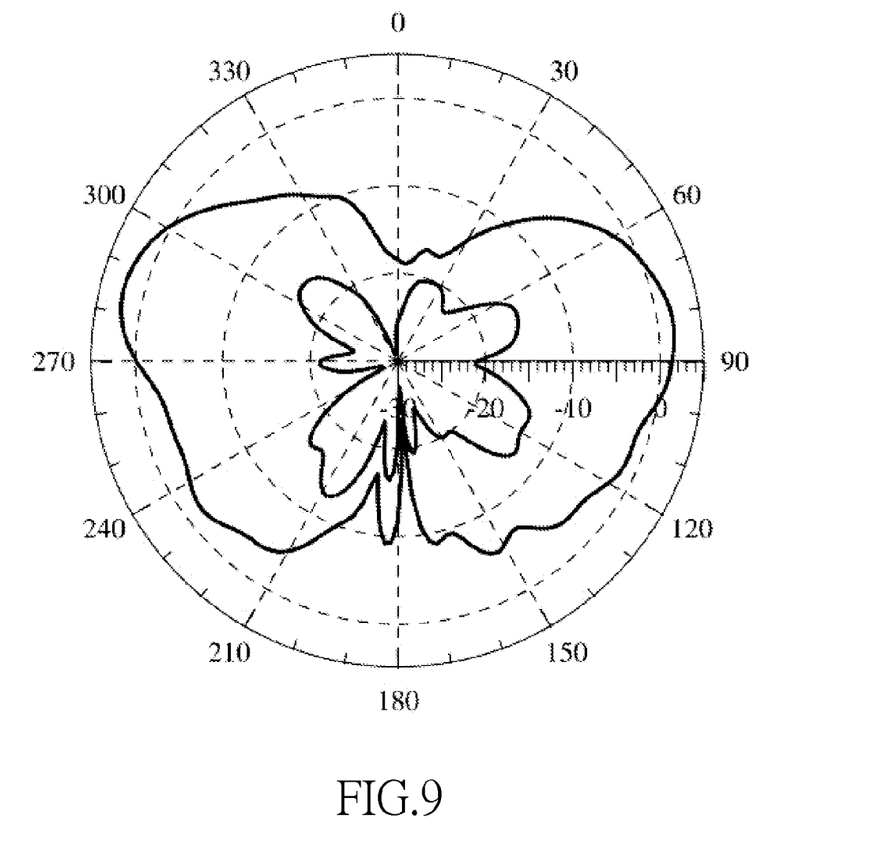
FIG. 9 is a graph showing an exemplary H-plane radiation pattern of the first embodiment at 2.6 GHz.

As one example, referring to FIG. 5, the conducting plate 211 of the first slot antenna body 21 has a width of 22 mm and a length of 90 mm. The main slot 212 in the conducting plate 211 has a width of 15 mm and a length of 80 mm. There is a distance of 1.5 mm between the coplanar waveguide transmission conductor 216 of the first slot antenna body 21 and the center of the conducting plate 211 in the lengthwise direction (L1). The coplanar waveguide transmission conductor 216 has a size of 1 mm in the lengthwise direction (L1). There is a gap of 0.5 mm between the coplanar waveguide transmission conductor 216 and each of the first and second grounding plate portions 213, 213' of the conducting plate 211 in the lengthwise direction (L1). The second slot antenna body 22 has the same dimensional specifications as those of the first slot antenna body 21. Therefore, the antenna 2 has a size of about $11\sqrt{2} \times 11\sqrt{2} \times 90$ mm$^3$. In this case, the antenna device 100 is capable of operating in a frequency range from 2.4 GHz to 2.8 GHz. FIG. 6 illustrates an exemplary radiation efficiency chart of the antenna device 100 depicting a relationship between radiation efficiency and frequency. From the radiation efficiency chart, the antenna device 100 has a radiation efficiency greater than 73% when operating in the above frequency range. FIG. 7 illustrates an exemplary gain chart of the antenna device 100 depicting a relationship between gain and frequency. From the gain chart, the antenna device 100 has a gain ranging from 2.5 dBi to 3.4 dBi when operating in the above frequency range. FIG. 8 shows an exemplary E-plane radiation pattern of the antenna device 100 at 2.6 GHz. The E-plane is defined by a widthwise direction (W1) of the conducting plate 211 and a widthwise direction (W2) of the conducting plate 221 (see FIG. 2). FIG. 9 shows an exemplary H-plane radiation pattern of the antenna device 100 at 2.6 GHz. The H-plane is defined by the lengthwise direction (L1/L2) and the widthwise direction (W2). In this example, the antenna 2 has a size of about $11\sqrt{2} \times 11\sqrt{2}$ mm$^2$ in transverse cross-section.

Figure 10:
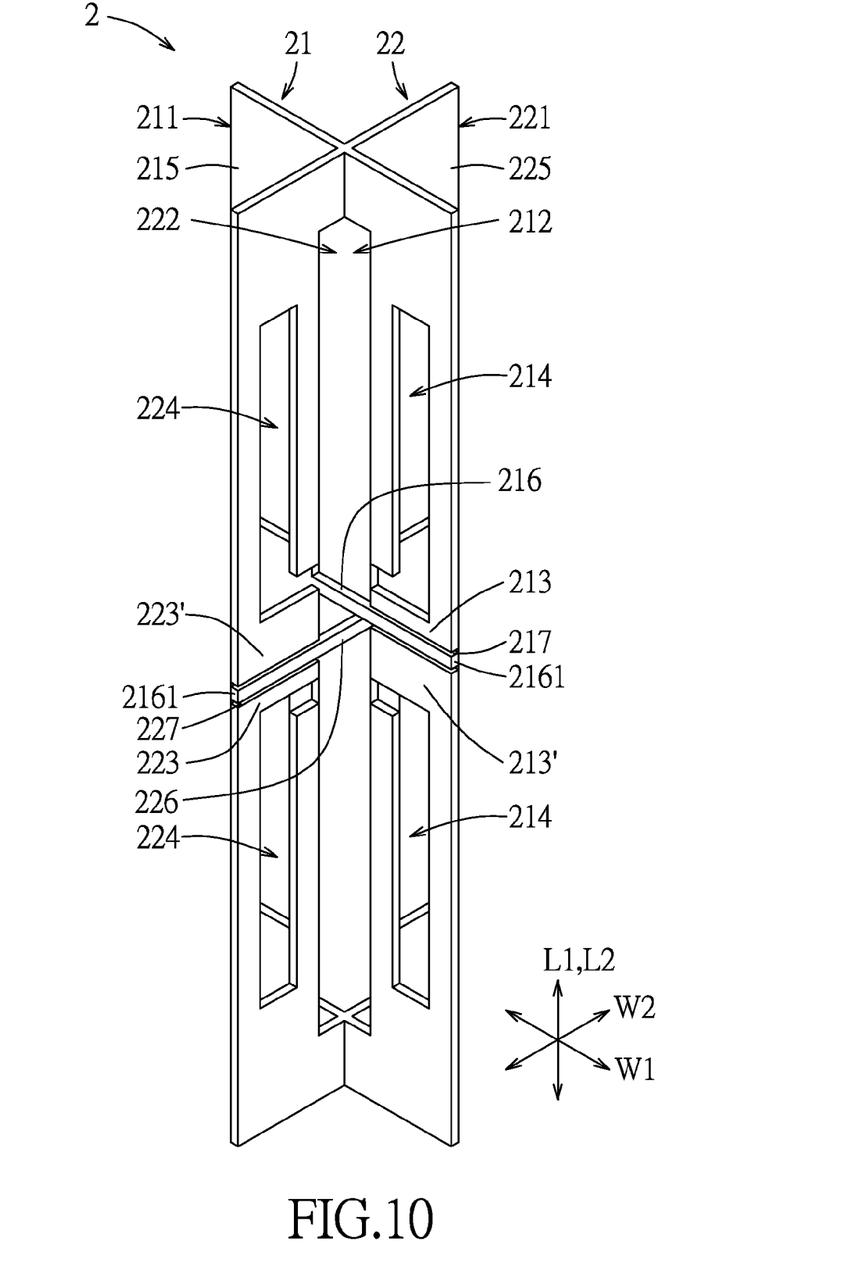
FIG. 10 is a perspective view showing an antenna of the second embodiment of an antenna device according to the present invention.

FIG. 10 illustrates an antenna 2 of the second embodiment of an antenna device 100 (see FIG. 1) according to this invention, which is a modification of the first embodiment. Unlike the first embodiment, the conducting plate 211, 221 of each of the first and second slot antenna bodies 21, 22 is further formed with four secondary slots 214, 224 (only two of each are labeled in FIG. 10) in spatial communication with the main slot 212, 222.

Figure 11:
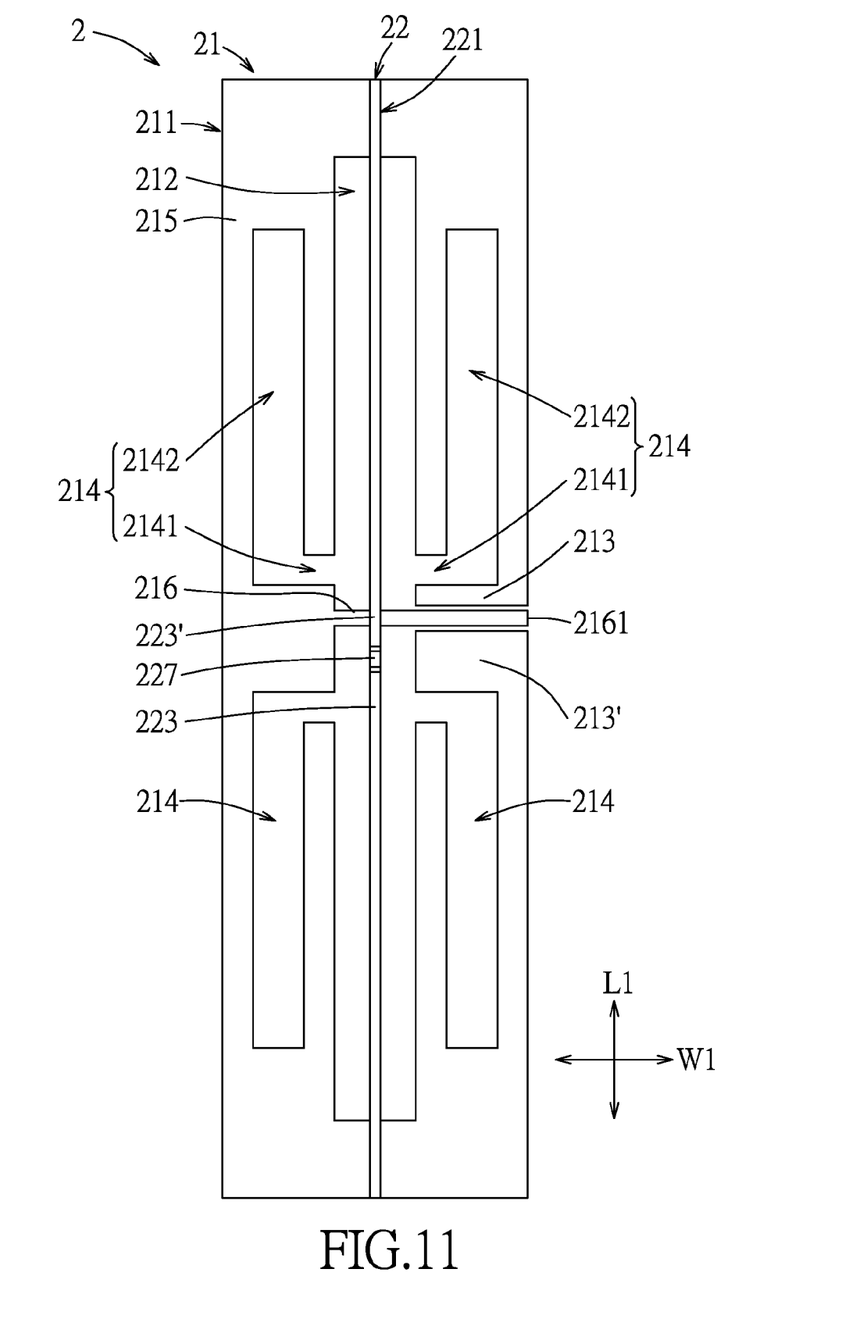
FIG. 11 is a schematic side view showing the antenna of the second embodiment for distinctly viewing a first slot antenna body.

Referring to FIGS. 10 and 11, for the first slot antenna body 21, the main slot 212 in the conducting plate 211 is narrower in the widthwise direction (W1) of the conducting plate 211 compared to the main slot 212 of FIG. 3. Each secondary slot 214 has a first slot section 2141 in spatial communication with the main slot 212, and a second slot section 2142 in spatial communication with the first slot section 2141. In this embodiment, the first slot section 2141 of each secondary slot 214 extends in the widthwise direction (W1) of the conducting plate 211, and the second slot section 2142 of each secondary slot 214 extends in the lengthwise direction (L1) of the conducting plate 211 away from the coplanar waveguide transmission conductor 216.

Figure 12:
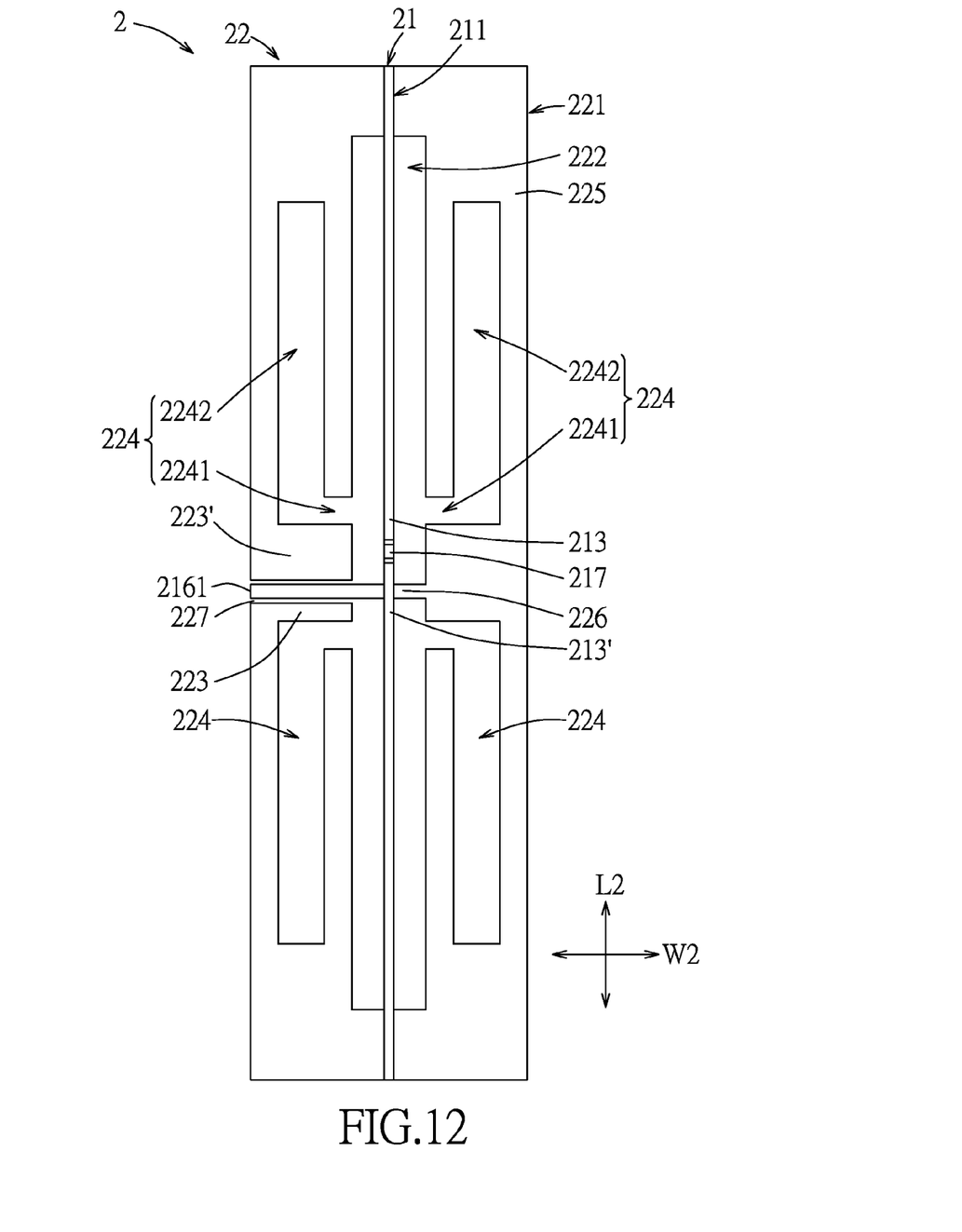
FIG. 12 is another schematic side view showing the antenna of the first embodiment for distinctly viewing a second slot antenna body.

Referring to FIGS. 10 and 12, for the second slot antenna body 22, the main slot 222 in the conducting plate 221 is narrower in the widthwise direction (W2) of the conducting plate 221 compared to the main slot 222 of FIG. 4. Each secondary slot 224 has a first slot section 2241 in spatial communication with the main slot 222, and a second slot section 2242 in spatial communication with the first slot section 2241. In this embodiment, the first slot section 2241 of each secondary slot 224 extends in the widthwise direction (W2) of the conducting plate 221, and the second slot section 2242 of each secondary slot 224 extends in the lengthwise direction (L2) of the conducting plate 221 away from the coplanar waveguide transmission conductor 226.

In such a configuration, upon feeding of the first and second RF signals ($S_1$, $S_2$) having the same magnitude and a 90-degree phase difference, the antenna 2 can thus produce a horizontally polarized omnidirectional radiation pattern. Since the antenna 2 is slim in shape and has a relatively small size in transverse cross-section, the antenna device 100 of this invention is suitable for installation in a relatively small space with a limited volume.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An antenna capable of producing a horizontally polarized omnidirectional radiation pattern when receiving a first radio frequency (RF) signal and a second RF signal that have the same magnitude and a 90-degree phase difference, said antenna comprising:
    a pair of first and second slot antenna bodies that integrally intersect each other and that are perpendicular to each other, said first and second slot antenna bodies being configured to respectively receive the first and second RF signals;
    wherein each of said first and second slot antenna bodies includes
    a flat conducting plate formed with a main slot, and a notch that is in spatial communication with said main slot and that is misaligned with a transverse central axis of said conducting plate, and
    an elongate coplanar waveguide transmission conductor that is coplanar with said conducting plate and that extends horizontally from said conducting plate through said main slot and into said notch;
    said conducting plates of said first and second slot antenna bodies integrally intersect and are perpendicular to each other, and are vertically inverted with respect to each other;
    said main slots in said conducting plates of said first and second slot antenna bodies are in spatial communication with each other; and
    said coplanar waveguide transmission conductors of said first and second slot antenna bodies are spaced apart from and perpendicular to each other.

2. The antenna as claimed in claim 1, wherein, for each of said first and second slot antenna bodies:
    said conducting plate has spaced apart first and second grounding plate portions that are vertically opposite to each other so as to define said notch therebetween, and a radiating plate portion that integrally interconnects and cooperates with said first and second grounding plate portions to define said main slot; and
    said coplanar waveguide transmission conductor has a connecting end that is connected integrally to said radiating plate portion of said conducting plate, and a feeding end that is horizontally opposite to said connecting end, that is disposed in said notch and spaced apart from said first and second grounding plate portions, and that is adapted to receive a respective one of the first and second RF signals.

3. The antenna as claimed in claim 2, wherein, for each of said first and second slot antenna bodies, said main slot extends in a lengthwise direction of said conducting plate that is perpendicular to the transverse central axis across a center of said conducting plate.

4. The antenna as claimed in claim 3, wherein said conducting plate of each of said first and second slot antenna bodies is further formed with a plurality of secondary slots in spatial communication with said main slot.

5. The antenna as claimed in claim 4, wherein, for each of said first and second slot antenna bodies:
    each of said secondary slots has a first slot section in spatial communication with said main slot, and a second slot section in spatial communication with said first slot section.

6. The antenna as claimed in claim 5, wherein, for each of said first and second slot antenna bodies:
    said first slot section of each of said secondary slots extends in a widthwise direction of said conducting plate that is parallel to the transverse central axis; and
    said second slot section of each of said secondary slots extends in the lengthwise direction of said conducting plate.

7. An antenna device comprising:
    an antenna including a pair of first and second slot antenna bodies that integrally intersect each other and that are perpendicular to each other; and
    a signal processor having an input port that is configured to receive an input radio frequency (RF) signal, and a first output port and a second output port that are coupled respectively to said first and second slot antenna bodies, said signal processor being operable to divide the input RF signal into a first RF signal and a second RF signal that have the same magnitude and a 90-degree phase difference and that are outputted respectively at said first and second output ports;
    wherein, upon receipt of the first and second RF signals from said signal processor, said antenna is capable of producing a horizontally polarized omnidirectional radiation pattern;
    wherein each of said first and second slot antenna bodies includes a flat conducting plate that is formed with a main slot, and a notch that is in spatial communication with said main slot and that is misaligned with a transverse central axis of said conducting plate, and an elongate coplanar waveguide transmission conductor that is coplanar with said conducting plate and that extends horizontally from said conducting plate through said main slot and into said notch;

wherein said conducting plates of said first and second slot antenna bodies integrally intersect and are perpendicular to each other, and are vertically inverted with respect to each other;

wherein said main slots in said conducting plates of said first and second slot antenna bodies are in spatial communication with each other; and wherein said coplanar waveguide transmission conductors of said first and second slot antenna bodies are spaced apart from and perpendicular to each other.

8. The antenna device as claimed in claim 7, wherein, for each of said first and second slot antenna bodies:

said conducting plate has spaced apart first and second grounding plate portions that are vertically opposite to each other so as to define said notch therebetween, and a radiating plate portion that integrally interconnects and cooperates with said first and second grounding plate portions to define said main slot; and said coplanar waveguide transmission conductor has a connecting end that is connected integrally to said radiating plate portion of said conducting plate, and a feeding end that is horizontally opposite to said connecting end, that is disposed in said notch and spaced apart from said first and second grounding plate portions, and that is coupled to a respective one of said first and second output ports of said signal processor for receiving a respective one of the first and second RF signals.

9. The antenna device as claimed in claim 8, wherein, for each of said first and second slot antenna bodies, said main slot extends in a lengthwise direction of said conducting plate that is perpendicular to the transverse central axis across a center of said conducting plate.

10. The antenna device as claimed in claim 9, wherein said conducting plate of each of said first and second slot antenna bodies is further formed with a plurality of secondary slots in spatial communication with said main slot.

11. The antenna device as claimed in claim 10, wherein, for each of said first and second slot antenna bodies:

each of said secondary slots has a first slot section in spatial communication with said main slot, and a second slot section in spatial communication with said first slot section.

12. The antenna device as claimed in claim 11, wherein, for each of said first and second slot antenna bodies:

said first slot section of each of said secondary slots extends in a widthwise direction of said conducting plate that is parallel to the transverse central axis; and said second slot section of each of said secondary slots extends in the lengthwise direction of said conducting plate.

13. The antenna device as claimed in claim 7, wherein said signal processor includes:

a two-way power divider having an input terminal that serves as said input port configured for receiving the input RF signal, a first output terminal that serves as said first output port, and a second output terminal, said two-way power divider being operable to divide the input RF signal into two identical RF signals that have half the power of the input RF signal and that are outputted respectively at said first and second output terminals, the RF signal outputted at said first output terminal serving as the first RF signal; and a 90-degree delay circuit coupled to said second output terminal of said two-way power divider for receiving the RF signal therefrom and further coupled to said second output port, said 90-degree delay circuit being operable to generate, based on the RF signal, an output signal that is phase shifted by 90 degrees relative to the RF signal and that is outputted to said second output port to serve as the second RF signal.

14. The antenna device as claimed in claim 7, wherein said signal processor includes a 90-degree hybrid coupler.

* * * * *